(12) United States Patent
Maeda et al.

(10) Patent No.: US 12,036,715 B2
(45) Date of Patent: Jul. 16, 2024

(54) THERMOPLASTIC RESIN SHEET HAVING HAIRLIKE BODIES AND MOLDED PRODUCT THEREOF

(71) Applicant: DENKA COMPANY LIMITED, Tokyo (JP)

(72) Inventors: Keishi Maeda, Isesaki (JP); Junpei Fujiwara, Isesaki (JP)

(73) Assignee: DENKA COMPANY LIMITED, Tokyo (JP)

( * ) Notice: Subject to any disclaimer, the term of this patent is extended or adjusted under 35 U.S.C. 154(b) by 937 days.

(21) Appl. No.: 16/961,893

(22) PCT Filed: Jan. 23, 2019

(86) PCT No.: PCT/JP2019/002066
§ 371 (c)(1),
(2) Date: Jul. 13, 2020

(87) PCT Pub. No.: WO2019/146635
PCT Pub. Date: Aug. 1, 2019

(65) Prior Publication Data
US 2020/0368956 A1   Nov. 26, 2020

(30) Foreign Application Priority Data

Jan. 24, 2018   (JP) .................................. 2018-009386

(51) Int. Cl.
*B29C 48/12* (2019.01)
*B29C 48/08* (2019.01)
(Continued)

(52) U.S. Cl.
CPC .............. *B29C 48/12* (2019.02); *B29C 48/08* (2019.02); *B29C 48/13* (2019.02); *B29C 59/02* (2013.01);
(Continued)

(58) Field of Classification Search
CPC ......... B29C 48/12; B29C 48/08; B29C 48/13; B29C 59/02; B29C 2059/023;
(Continued)

(56) References Cited

U.S. PATENT DOCUMENTS 3,557,407 A    1/1971   Lemelson
4,787,837 A *  11/1988  Bell ...................... B29C 59/002
                                                          264/293
(Continued)

FOREIGN PATENT DOCUMENTS

CA    2 324 313 A1   9/1999
EP    1 564 828 A2   8/2005
(Continued)

OTHER PUBLICATIONS

Fujiwara et al. (WO2017/159678A1); Sep. 21, 2017 (EPO machine translation). (Year: 2017).*
(Continued)

*Primary Examiner* — Jeffrey M Wollschlager
(74) *Attorney, Agent, or Firm* — Oliff PLC

(57) ABSTRACT

A resin sheet having hairlike bodies arranged regularly on at least one surface of an underlayer can be manufactured by forming the bodies by: melt extruding, from a die with an extrusion molding method, a thermoplastic resin having, on a log-log graph having elongational viscosity η(t) (unit: Pa·S) as measured at a strain rate of 0.5 (unit: S−1) and at a temperature at which elongation is possible as the vertical axis and elongation time t (unit: S) as the horizontal axis, a region in which the slope (log η/log t) in the interval 0.1<t<1.0 is no greater than 0.5 and by the temperature range wherein the adhesive force in probe tack measurement is 0.05-0.25 N/mm2 at least partially overlapping with the
(Continued)

temperature at which elongation is possible; and casting using a transfer roll on which a relief process has been performed and a touch roll.

2 Claims, 7 Drawing Sheets

(51) Int. Cl.
*B29C 48/13* (2019.01)
*B29C 59/02* (2006.01)
*B29K 21/00* (2006.01)
*B29K 23/00* (2006.01)
*B29K 75/00* (2006.01)
*B29K 101/12* (2006.01)
*B29L 31/00* (2006.01)
*B29L 31/30* (2006.01)
*B29L 31/34* (2006.01)
*B32B 3/26* (2006.01)
*B32B 3/30* (2006.01)
*B32B 27/08* (2006.01)
*B32B 27/32* (2006.01)
*B32B 27/40* (2006.01)

(52) U.S. Cl.
CPC ............... *B32B 3/26* (2013.01); *B32B 3/30* (2013.01); *B32B 27/08* (2013.01); *B32B 27/32* (2013.01); *B32B 27/40* (2013.01); *B29K 2021/003* (2013.01); *B29K 2023/00* (2013.01); *B29K 2075/00* (2013.01); *B29K 2101/12* (2013.01); *B29L 2031/3005* (2013.01); *B29L 2031/3481* (2013.01); *B29L 2031/712* (2013.01); *B32B 2439/40* (2013.01); *B32B 2605/003* (2013.01)

(58) Field of Classification Search
CPC ............... B29C 59/025; B29C 43/222; B29C 48/0011; B29C 48/495; B29C 51/10; B29C 59/04; B32B 3/26; B32B 3/30; B32B 27/08; B32B 27/32; B32B 27/40; B32B 2439/40; B32B 2605/003; B29K 2021/003; B29K 2023/00; B29K 2075/00; B29K 2101/12; B29L 2031/3005; B29L 2031/3481; B29L 2031/712; B29L 2007/002; B29L 2031/765
See application file for complete search history.

(56) References Cited

U.S. PATENT DOCUMENTS

| | | | |
|---|---|---|---|
| 6,511,734 | B1 | 1/2003 | Wagner |
| 2009/0196058 | A1 | 8/2009 | Ishida et al. |
| 2009/0325045 | A1 | 12/2009 | Miyahisa et al. |
| 2010/0173547 | A1 | 7/2010 | Katayama et al. |
| 2013/0141792 | A1* | 6/2013 | Ueda ............ G02B 5/0268 359/601 |
| 2014/0194277 | A1 | 7/2014 | Ishihama et al. |
| 2015/0010747 | A1 | 1/2015 | Hotta et al. |
| 2015/0314554 | A1* | 11/2015 | Fujiwara ............ B29C 71/04 428/142 |
| 2019/0283301 | A1 | 9/2019 | Fujiwara et al. |
| 2020/0215787 | A1 | 7/2020 | Fujiwara et al. |

FOREIGN PATENT DOCUMENTS

| | | | |
|---|---|---|---|
| EP | 3 431 284 A1 | 1/2019 | |
| EP | 3 670 147 A1 | 6/2020 | |
| JP | S64-42218 A | 2/1989 | |
| JP | H07-001626 A | 1/1995 | |
| JP | H09-057934 A | 3/1997 | |
| JP | 2002-506753 A | 3/2002 | |
| JP | 2002-526669 A | 8/2002 | |
| JP | 2005-228911 A | 8/2005 | |
| JP | 2007-246122 A | 9/2007 | |
| JP | 2009-138092 A | 6/2009 | |
| JP | 2009-184421 A | 8/2009 | |
| JP | 2010-280203 A | 12/2010 | |
| JP | 2011-098739 A | 5/2011 | |
| JP | 2011-152795 A | 8/2011 | |
| JP | 4877008 B2 | 2/2012 | |
| JP | 2017-029608 A | 2/2017 | |
| WO | WO2016047548 * | 3/2016 | |
| WO | 2017/159678 A1 | 9/2017 | |
| WO | WO-2017159678 A1 * | 9/2017 | ........... B29C 59/046 |
| WO | 2018/016562 A1 | 1/2018 | |

OTHER PUBLICATIONS

Aug. 3, 2021 Office Action issued in Chinese Patent Application No. 201980008517.6.
Feb. 17, 2021 Extended Search Report issued in European Patent Application No. 19744043.1.
Apr. 16, 2019 International Search Report issued in International Patent Application No. PCT/JP2019/002066.

\* cited by examiner

THERMOPLASTIC RESIN SHEET HAVING HAIRLIKE BODIES AND MOLDED PRODUCT THEREOF

TECHNICAL FIELD

The present invention pertains to a thermoplastic resin sheet having hairlike bodies and a molded product thereof.

BACKGROUND ART

Conventionally, sheets of paper and polymer materials are used as interior materials of automobiles and the housings of associated components, housings of electronic devices and appliances, building materials such as wallpaper, housings for toys and game consoles, and members of daily necessities. Further, as a method to provide a good tactile sensation to a surface of a sheet, Patent Document 1, for example, presents a decorative sheet wherein a thermoplastic polyester-based resin is extrusion laminated on a decorative paper.

Patent Document 2 presents a decorative sheet containing resin beads. Patent Document 3 presents a decorative resin sheet in which a polylactic acid resin is coated with a urethane-based resin and a surface thereof is heat-embossed.

Furthermore, Patent Document 4 presents a decorative sheet in which, in order for a relief shape on the sheet surface not to be impaired, a protective layer consisting of anti-abrasive particles and a urethane-based resin is formed on a surface of an embossed ABS resin sheet. Patent Document 5 presents a container having a plurality of stripes in a fixed direction and provided with a napped decorative surface formed by raising a nap from the stripes.

However, the provision of a resin sheet expressing a better tactile sensation is desired.

[Patent Document 1] JP H9-057934 A
[Patent Document 2] JP 04877008 B
[Patent Document 3] JP 2011-152795 A
[Patent Document 4] JP 2010-280203 A
[Patent Document 5] JP 2011-098739 A

SUMMARY OF INVENTION

Technical Problem

The objective of the present invention is to provide a sheet expressing a good tactile sensation and a molded product thereof.

Solution to Problem

That is, as a result of investigation of various tactile sensation-expressing means, the present inventors believed that a good tactile sensation is expressed by forming hairlike bodies arranged regularly on a surface. The present inventors continued their research and completed the present invention, finding that a resin sheet having hairlike bodies arranged regularly on at least one surface of an underlayer can be manufactured by forming hairlike bodies by: melt extruding, from a die with an extrusion molding technique, a thermoplastic resin characterized by having, on a log-log graph having elongational viscosity $\eta(t)$ (unit: Pa·S) as measured at a strain rate of 0.5 (unit: $S^{-1}$) and at a temperature at which elongation is possible as the vertical axis and elongation time t (unit: S) as the horizontal axis, a region in which the slope (log $\eta$/log t) in the interval $0.1<t<1.0$ is no greater than 0.5 and by the temperature range in which the adhesive force in probe tack measurement is 0.05-0.25 N/mm² at least partially overlapping with the temperature at which elongation is possible; and casting using a transfer roll on which a relief process has been performed and a touch roll.

The present invention, which solves the above problem, is configured as follows.

(1) A resin sheet having hairlike bodies arranged regularly on at least one surface of an underlayer, comprising a thermoplastic resin characterized by having, on a log-log graph having elongational viscosity $\eta(t)$ (unit: Pa·S) as measured at a strain rate of 0.5 (unit: $S^{-1}$) and at a temperature at which elongation is possible as the vertical axis and elongation time t (unit: S) as the horizontal axis, a region in which the slope (log $\eta$/log t) in the interval $0.1<t<1.0$ is no greater than 0.5 and by the temperature range in which the adhesive force in probe tack measurement is 0.05-0.25 N/mm² at least partially overlapping with the temperature at which elongation is possible.

(2) The resin sheet described in (1), wherein the average height of the hairlike bodies is no less than 100 μm and no greater than 1,200 μm, the average diameter of the hairlike bodies is no less than 1 μm and no greater than 50 μm, and the average spacing between the hairlike bodies is no less than 20 μm and no greater than 200 μm.

(3) The resin sheet described in (1) or (2), wherein the dynamic friction coefficient of the surface having the hairlike bodies is 0.05-0.80.

(4) The resin sheet described in any one of (1) to (3), wherein the heat transfer speed of the surface having the hairlike bodies, when in contact, is 0.005-0.500 W/cm².

(5) The resin sheet described in any one of (1) to (4), configured so the hairlike bodies extend hairlike in a direction away from the underlayer and a swelling is formed at the tips thereof.

(6) The resin sheet described in any one of (1) to (5), wherein the thermoplastic resin is an olefin-based resin.

(7) The resin sheet described in any one of (1) to (5), wherein the thermoplastic resin is a urethane-based elastomer.

(8) A manufacturing method for a resin sheet having hairlike bodies arranged regularly on at least one surface of an underlayer, characterized in that the hairlike bodies are formed by: melt extruding, from a die with an extrusion molding technique, a thermoplastic resin characterized by having, on a log-log graph having elongational viscosity $\eta(t)$ (unit: Pa·S) as measured at a strain rate of 0.5 (unit: $S^{-1}$) and at a temperature at which elongation is possible as the vertical axis and elongation time t (unit: S) as the horizontal axis, a region in which the slope (log $\eta$/log t) in the interval $0.1<t<1.0$ is no greater than 0.5 and by the temperature range in which the adhesive force in probe tack measurement is 0.05-0.25 N/mm² at least partially overlapping with the temperature at which elongation is possible; and casting using a transfer roll on which a relief process has been performed and a touch roll.

(9) The manufacturing method described in (8), characterized in that at least part of the transfer roll surface is ceramic sprayed and a relief process has been performed on the ceramic-sprayed surface.

(10) A molded product of the resin sheet described in any one of (1) to (7).

(11) The molded product described in (10), which is a stationery member.

(12) The molded product described in (10), which is an automobile interior member, an electronic device, an electronic device cladding, a cosmetic container, or a container member that is vacuum-pressure molded on a surface of an existing molded product.

Effects of Invention

According to the present invention, a sheet expressing a good tactile sensation can be provided.

DESCRIPTION OF EMBODIMENTS

Below, various embodiments of the resin sheet shall be explained, followed by an explanation of the method for manufacturing the resin sheet, but in cases in which the specific explanation of one embodiment described herein applies to another embodiment, the explanation thereof for the other embodiment shall be omitted.

First Embodiment

The resin sheet according to the first embodiment of the present invention is a resin sheet having hairlike bodies arranged regularly on at least one surface of an underlayer, comprising a thermoplastic resin characterized by having, on a log-log graph having elongational viscosity $\eta(t)$ (unit: Pa·S) as measured at a strain rate of 0.5 (unit: $S^{-1}$) and at a temperature at which elongation is possible as the vertical axis and elongation time t (unit: S) as the horizontal axis, a region in which the slope (log $\eta$/log t) in the interval $0.1<t<1.0$ is no greater than 0.5 and by the temperature range in which the adhesive force in probe tack measurement is 0.05-0.25 N/mm² at least partially overlapping with the temperature at which elongation is possible.

Underlayer

Figure 1:
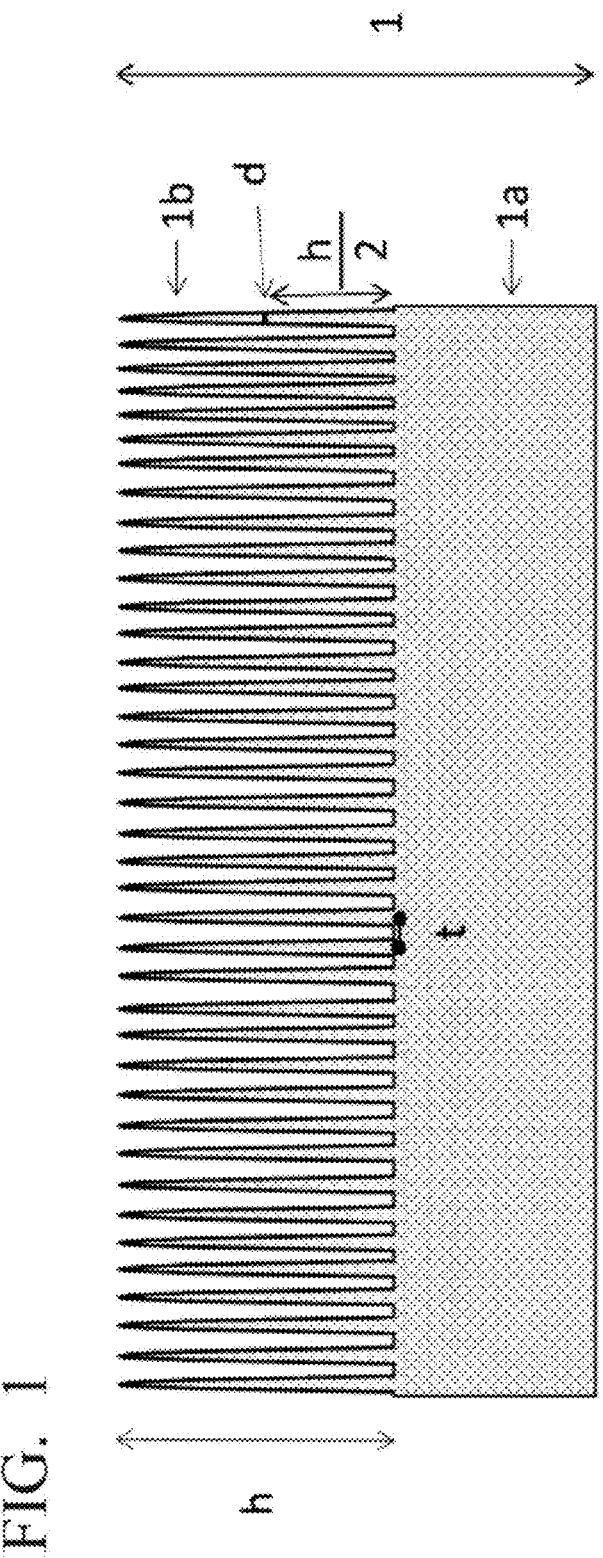
FIG. 1 is a vertical side cross-sectional schematic showing a resin sheet according to the first embodiment of the present invention.

The underlayer (1a) is a layer having the hairlike bodies arranged regularly on at least one surface and, as shown in FIG. 1, is the portion of the surface other than the hairlike bodies. The thickness of the underlayer is the thickness from the roots of the hairlike bodies to the surface on the opposite side of the underlayer. It is preferable that the average thickness of the underlayer is 50-1,000 μm and more preferably, 150-800 μm. By setting the thickness to no less than 50 μm, the height of the hairlike bodies can be sufficiently expressed. Further, by setting the thickness to no greater than 1,000 μm, the hairlike bodies can be formed efficiently.

A continuous phase is formed without a structural boundary between the underlayer and the hairlike bodies. The absence of a structural boundary means that the underlayer and hairlike bodies are integrally formed and that there is no structurally clear border section therebetween. Further, forming a continuous phase means a state in which there are no seams between the underlayer and the hairlike bodies and no discontinuities (is a continuous phase). On this point, the present invention differs from a structure in which hairlike bodies are transplanted to an underlayer. The underlayer and hairlike bodies have the same composition and the bonds between the underlayer and the hairlike bodies may include covalent bonds. Covalent bonds are chemical bonds formed by an electron pair being shared by two atoms, but in thermoplastic resins which are chain molecules in which the monomers are connected, each polymer is bonded by covalent bonds and is bonded more strongly than by the van der Waals bonds or hydrogen bonds acting between the polymer molecules.

Further, the underlayer and the hairlike bodies may be derived not from separate, but from the same solid thermoplastic resin sheet. Derived from the same solid thermoplastic resin sheet means, for example, the hairlike bodies and the underlayer being obtained, directly or indirectly, based on the same solid resin sheet.

Further, the underlayer and the hairlike bodies may be formed from the same solid thermoplastic resin sheet. Formed from the same solid thermoplastic resin sheet means that the hairlike bodies and the underlayer are directly formed by working a single resin sheet.

By forming a continuous phase without a structural boundary between the underlayer and the hairlike bodies, the hairlike bodies separating from the underlayer due to an external stimulus is suppressed and the sheet becomes one with a good tactile sensation. Further, manufacturing with fewer steps than when transplanting hairlike bodies can be carried out.

The underlayer is formed using a thermoplastic resin. Thermoplastic resins characterized by having, on a log-log graph having elongational viscosity $\eta(t)$ (unit: Pa·S) as measured at a strain rate of 0.5 (unit: $S^{-1}$) and at a temperature at which elongation is possible as the vertical axis and elongation time t (unit: S) as the horizontal axis, a region in which the slope (log $\eta$/log t) in the interval $0.1<t<1.0$ is no greater than 0.5 and by the temperature range in which the adhesive force in probe tack measurement is 0.05-0.25 N/mm² at least partially overlapping with the temperature at which elongation is possible can be used as the thermoplastic resin.

Temperature at Which Elongation is Possible

In the present embodiment, the temperature at which elongation is possible indicates the temperature at which the thermoplastic resin demonstrates plasticity and elongation (for example, stretch molding) becomes possible. The temperature at which elongation is possible can be determined from the condition of a strand when the strand is set in a uniaxial elongation viscometer and stretched at various temperatures. When the temperature is low, the resin does not demonstrate plasticity (is in a rigid state) and the roll to which the strand is fixed runs idle. Further, the resin enters a molten state when the temperature is high and cannot be fixed to the roll or the elongational viscosity when fixed to the roll and stretched does not satisfy $1.0 \times 10^4$ (unit: Pa·S) and the strand breaks. Temperatures positioned between those of the rigid state and the molten state are defined as the temperature at which elongation is possible.

Elongational Viscosity

The thermoplastic resin of the present embodiment has, on a log-log graph having elongational viscosity η(t) (unit: Pa·S) as measured at a strain rate of 0.5 (unit: $S^{-1}$) and at a temperature at which elongation is possible as the vertical axis and elongation time t (unit: S) as the horizontal axis, a region in which the slope (log η/log t) in the interval $0.1 < t < 1.0$ is no greater than 0.5.

Elongational viscosity can be measured using a commercially available elongation viscosity measuring instrument at a strain rate of 0.17, 0.5, or 0.83 $S^{-1}$ at a measurement temperature that is a temperature at which the thermoplastic resin can be elongated, for example, 100, 110, 120, 130, 140, 150, or 160° C.

Due to the thermoplastic resin having a region such as that described above, the thermoplastic resin demonstrates plasticity at the temperature at which elongation is possible and when stretch molding is performed, the resin can maintain the stretched state without greatly shrinking, even when the location of the thermoplastic resin that was stretched has been released from the stretching force.

Adhesive Force

The adhesive force of the thermoplastic resin can be measured by, for example, an inclined ball tack method, a rolling ball tack method, or a probe tack method.

As probe tack measurements, there are the Wetzel method, the Kanbe/Kamagata method, the Hammond method, and the Rhesca method. Among these, probe tack measurements excluding the Rhesca method bring, from below, a probe close to a sample placed with the viscous surface of the sample downwards and detect the force necessary to peel the probe from the adhesive surface by moving the probe downwards at a fixed speed after contact. The Rhesca method places the adhesive surface of the sample upwards and detects the peeling force by pushing the probe into the adhesive surface from above. The Rhesca method can be suitably used when measuring the adhesion of a molten polymer material surface during processing.

In the present embodiment, if the adhesive force is within the range 0.05-0.25 $N/mm^2$, the thermoplastic resin moderately adheres to the transfer roll surface and the hairlike bodies can be formed. Further, the adhesive force in a probe tack measurement using a probe of the same material as the transfer roll surface is more preferably within the range 0.10-0.20 $N/mm^2$.

In certain embodiments, adhesion between the transfer roll surface and the thermoplastic resin can be adjusted not only by altering the material of the transfer roll surface or adjusting the temperature (the temperature of the thermoplastic resin, the transfer roll, or the touch roll) when casting, but also by using a mold release agent on the transfer roll surface or altering the surface roughness of the transfer roll surface.

It is preferable that the melt mass flow rate of the thermoplastic resin is no less than 4 g/10 minutes at 190° C. to 300° C. By setting the rate to no less than 4 g/10 min, the transferability of the shape of the hairlike bodies can be improved. The melt mass flow rate conforms to JIS K 7210 and is a value measured under the conditions of a load (2.16 Kg to 10.0 Kg) at a test temperature in the temperature range from 190° C. to 300° C.

A resin comprising one or more of a styrene-based resin, an olefin-based resin, a polyvinyl chloride resin, a thermoplastic elastomer, a fluorine-based resin, a polyester-based resin, and a nylon-based resin can be selected and used as the thermoplastic resin of the present embodiment.

Styrene-based monomers such as styrene, α-methylstyrene, p-methylstyrene, dimethylstyrene, p-t-butylstyrene, or chlorostyrene alone or copolymers thereof, copolymers of such a styrene-based monomer and another monomer, for example, a styrene-acrylonitrile copolymer (AS resin), or of the styrene-based monomer and yet another polymer, for example, a grafted polymer graft polymerized in the presence of a diene-based rubber-like polymer such as polybutadiene, a styrene-butadiene copolymer, polyisoprene, or polychloroprene, for example, a polystyrene such as high-impact polystyrene (HIPS resin) or a styrene-acrylonitrile graft polymer (ABS resin) can be used as the styrene-based resin. Further, a styrene-based thermoplastic elastomer can also be used.

Olefin-based resin means a resin comprising a polymer comprising α-olefin as a monomer and includes polyethylene-based resins and polypropylene-based resins. A high-density polyethylene, a low-density polyethylene, a linear low-density polyethylene, a linear medium-density polyethylene, etc. can be used as the polyethylene resin and not only these alone, but a copolymer, graft, or blend having these structures can also be used. As the latter resin, there are, for example, products of copolymerizing and blending a resin having a polar group in a polyethylene chain, such as blends with an ethylene-vinyl acetate copolymer, an ethylene-acrylic acid copolymer, an ethylene-acrylic ester copolymer, an ethylene methacrylic ester copolymer, an ethylene-vinyl acetate-vinyl chloride copolymer, or three-component copolymers with a further acid anhydride.

Further, a homopolypropylene, a random polypropylene, a block polypropylene, etc. can be used as the polypropylene resin. When using a homopolypropylene, the structure of the homopolypropylene may be any of isotactic, atactic, or syndiotactic. When using a random polypropylene, a substance preferably having 2-20 carbon atoms and more preferably having 4-12 carbon atoms, for example, ethylene, 1-butene, 1-pentene, 1-hexene, 1-heptene, 1-octene, 1-nonene, or 1-decene can be used as the α-olefin to be copolymerized with propylene. When using a block polypropylene, a block copolymer (block polypropylene), a block copolymer comprising a rubber component, a graft copolymer, etc. can be used. In addition to using these olefin-based resins alone, they may be used in combination with other olefin-based resins.

A vinyl chloride homopolymer or a copolymer of vinyl chloride and another comonomer can be used as the polyvinyl chloride resin. When the polyvinyl chloride is a copolymer, the polyvinyl chloride may be a random copolymer or may be a graft copolymer. A substance in which, for example, an ethylene-vinyl acetate copolymer or a thermoplastic urethane polymer is made the trunk polymer and vinyl chloride is graft polymerized thereto can be raised as one example of a graft copolymer. The polyvinyl chloride that can be used in the present embodiment is a composition demonstrating an extrusion-moldable soft polyvinyl chloride and containing an additive such as a polymer plasticizer. A publicly known polymer plasticizer can be used as the polymer plasticizer, but, for example, an ethylene copolymer polymer plasticizer such as an ethylene-vinyl acetate-carbon monoxide copolymer, an ethylene-(meth)acrylic ester-carbon monoxide copolymer, or an ethylene-vinyl acetate copolymer with a high vinyl acetate content can be raised as a preferred example.

Substances having a structure in which a soft polymer substance and a hard polymer substance are combined are included as the thermoplastic elastomer. Specifically, there are styrene-based elastomers, olefin-based elastomers, vinyl chloride-based elastomers, polyester-based elastomers, polyamide-based elastomers, polyurethane-based elastomers, etc. Regarding polyurethane-based elastomers, as a combination of an isocyanate and a polyol, which are raw materials, any combination of an MDI system, an $H_{12}$ MDI system, or an HDI system as the isocyanate and a polyether system, a polyester system, or a polycarbonate system as the polyol may be selected or multiple may be combined. These elastomers can be selected from among those generally commercially available and used.

A vinylidene fluoride homopolymer and a vinylidene fluoride copolymer having vinylidene fluoride as the main component can be used as the fluorine-based resin. Polyvinylidene fluoride (PVDF) resins are crystalline resins exhibiting various crystal structures such as α-type, β-type, γ-type, and αp-type, but as the vinylidene fluoride copolymer, there are, for example, vinylidene fluoride-hexafluoropropylene copolymers, vinylidene fluoride-tetrafluoroethylene copolymers, vinylidene fluoride-chlorotrifluoroethylene copolymers, vinylidene fluoride-trifluoroethylene copolymers, vinylidene fluoride-tetrafluoroethylene-hexafluoropropylene three-component copolymers, vinylidene fluoride-chlorotrifluoroethylene-hexafluoropropylene three-component copolymers, and mixtures of two or more thereof.

Polyethylene terephthalate, polybutylene terephthalate, polyethylene-2,6-naphthalate, polymethylene terephthalate, a polyester resin in which, as copolymerization components, for example, a diol component such as diethylene glycol, neopentyl glycol, and polyalkylene glycol and a dicarboxylic acid component such as adipic acid, sebacic acid, phthalic acid, isophthalic acid, and 2,6-naphthalene dicarboxylic acid are copolymerized, etc. can be used as the polyester-based resin.

A lactam polymer such as caprolactam and laurolactam, a polymer of an aminocarboxylic acid such as 6-aminocaproic acid, 11-aminoundecanoic acid, and 12-aminododecanoic acid, a polycondensate of a diamine unit such as an aliphatic diamine such as hexamethylenediamine, decamethylenediamine, dodecamethylenediamine, and 2,2,4- or 2,4-4-trimethylhexamethylenediamine, an alicyclic diamine such as 1,3- or 1,4-bis(aminomethyl)cyclohexane or bis(p-aminocyclohexylmethane), or an aromatic diamine such as m- or p-xylylenediamine, and a dicarboxylic acid unit such as an aliphatic dicarboxylic acid such as adipic acid, suberic acid, and sebacic acid, an alicyclic dicarboxylic acid such as cyclohexanedicarboxylic acid, or an aromatic dicarboxylic acid such as terephthalic acid and isophthalic acid, and copolymers, etc. thereof can be used as the nylon-based resin. For example, there are nylon 6, nylon 9, nylon 11, nylon 12, nylon 66, nylon 610, nylon 611, nylon 612, nylon 6T, nylon 6I, nylon MXD6, nylon 6/66, nylon 6/610, nylon 6/6T, nylon 6I/6T, etc. and among these, nylon 6 and nylon MXD6 are suitable.

The thermoplastic resin may be alloyed with the above-mentioned thermoplastic resin at any ratio in a range that does not inhibit the effects of the present invention. Furthermore, the thermoplastic resin may contain other additives. Additives such as water/oil repellents, colorants such as pigments or dyes, mold release agents such as silicone oil or alkyl ester-based agents, fibrous reinforcement agents such as glass fibers, granular lubricants such as talc, clay, or silica, a salt compound of sulfonic acid and an alkali metal or the like, antistatic agents, ultraviolet absorbing agents, flame retardants, and antibacterial agents can be added as the other additives in a range that does not inhibit the effects of the present invention. Further, scrap resin generated in the resin sheet manufacturing process can be mixed and used.

As the water/oil repellent, there are silicone-based water repellents, carnauba wax, and fluorine-based water/oil repellents. Organopolysiloxane, dimethylpolysiloxane, methylphenylpolysiloxane, methylhydrogenpolysiloxane, etc. are examples of the silicon and among these, dimethylpolysiloxane is suitably used. As commercial products, there are "Clinbell CB50-PP", "Clinbell CB-30PE", "Clinbell CB-1", "Clinbell CB-50AB" (manufactured by Fuji Chemical Industries, Ltd.), etc. in which, for example, silicone is alloyed with a resin. For the carnauba wax, there are, for example, "Carnauba No. 1" (manufactured by NIKKO RICA CORPORATION) and the like as commercially available products, surfactants having a perfluoroalkyl group as fluorine-based oil/water repellents, and "Surflon KT-PA" (manufactured by AGC SEIMI CHEMICAL CO., LTD.) as a commercial product. The amount of the water/oil repellent added is preferably 1 mass % to 25 mass %.

As the antistatic agent, there are polyetheresteramide-based polymer-type antistatic agents, ionomer-based polymer-type antistatic agents, etc. As commercially available polyetheresteramide-based polymer-type antistatic agents, there are "Pelestat 230", "Pelestat 6500", "Pelectron AS", "Pelectron HS" (manufactured by Sanyo Chemical Industries, Ltd.), etc. As commercially available ionomer-based polymer-type antistatic agents, there are "Entira SD100", "Entira MK400" (manufactured by DU PONT-MITSUI POLYCHEMICALS), etc. The amount of the antistatic agent added is preferably 5 mass % to 30 mass %.

Among inorganic-based and organic-based antibacterial agents, either may be added. Considering dispersability, inorganic-based agents are preferable. Specifically, there are metal ion (Ag, Zn, Cu) inorganic-based antibacterial agents, calcined shell calcium-based antibacterial agents, etc. As commercially available metal ion inorganic-based antibacterial agents, there are "Bactekiller BM102VT" (manufactured by Fuji Chemical Industries, Ltd.), "Novaron VZF200", "Novaron (AG300)" (manufactured by TOAGOSEI CO., LTD.), "KM-10D-G", "IM-10D-L" (manufactured by Sinanen Zeomic Co., Ltd.), etc. As calcined shell calcium-based antibacterial agents, there is "Scallow" (manufactured by FID, Ltd.), etc. The amount of the antibacterial agent added is preferably 0.5 mass % to 5 mass %.

Hairlike Bodies

The hairlike bodies (1b) are formed using a thermoplastic resin and are a portion extending hairlike from the surface of the underlayer (1a), as shown in FIG. 1. The hairlike bodies are arranged regularly on the surface of the underlayer. Here, the regular arrangement means a state in which the hairlike bodies are not arranged randomly, that is, a state arranged in an orderly fashion in one direction or in two directions. Whether or not the arrangement of the hairlike bodies is regular is determined based on the state of arrangement of the roots of the hairlike bodies. In certain embodiments, the hairlike bodies are positioned on the underlayer at a predetermined spacing and the positions of the bottom surfaces of the hairlike bodies are arranged in an orderly fashion in the longitudinal direction and the transverse direction of the underlayer. Further, the form of arrangement of the hairlike bodies is not particularly limited and a vertically and horizontally arranged grid arrangement, staggered arrangement, etc. can be selected. Due to the hairlike bodies being arranged regularly on the surface of the underlayer, a good tactile sensation is readily expressed, uniformly and without irregularities. Falling of the hairlike bodies occurs due to the application of a load such as, for example, tracing with a finger and finger marks in which the gloss and color tone differ from those of the surrounding portion can be formed. Further, due to the hairlike bodies, the tactile sensation can become like that of a suede-like napped sheet.

The average height (h) of the hairlike bodies is preferably 100-1,200 µm and more preferably 120-900 µm. By setting the average height to no less than 100 µm, a good tactile sensation can be sufficiently ensured and by setting the average height to no greater than 1,200 µm, a good tactile sensation such as moistness, softness, and fluffiness is obtained.

Figure 2:
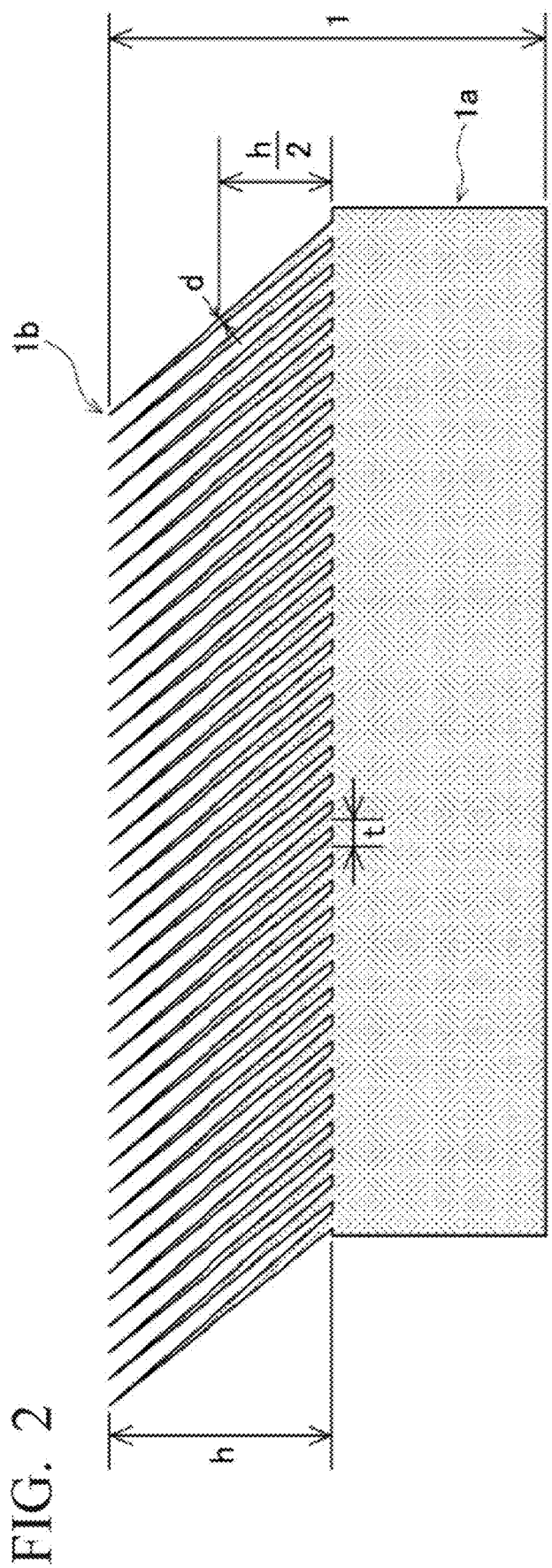
FIG. 2 is a vertical side cross-sectional schematic showing a variation of the resin sheet according to the first embodiment of the present invention.
Figure 3:
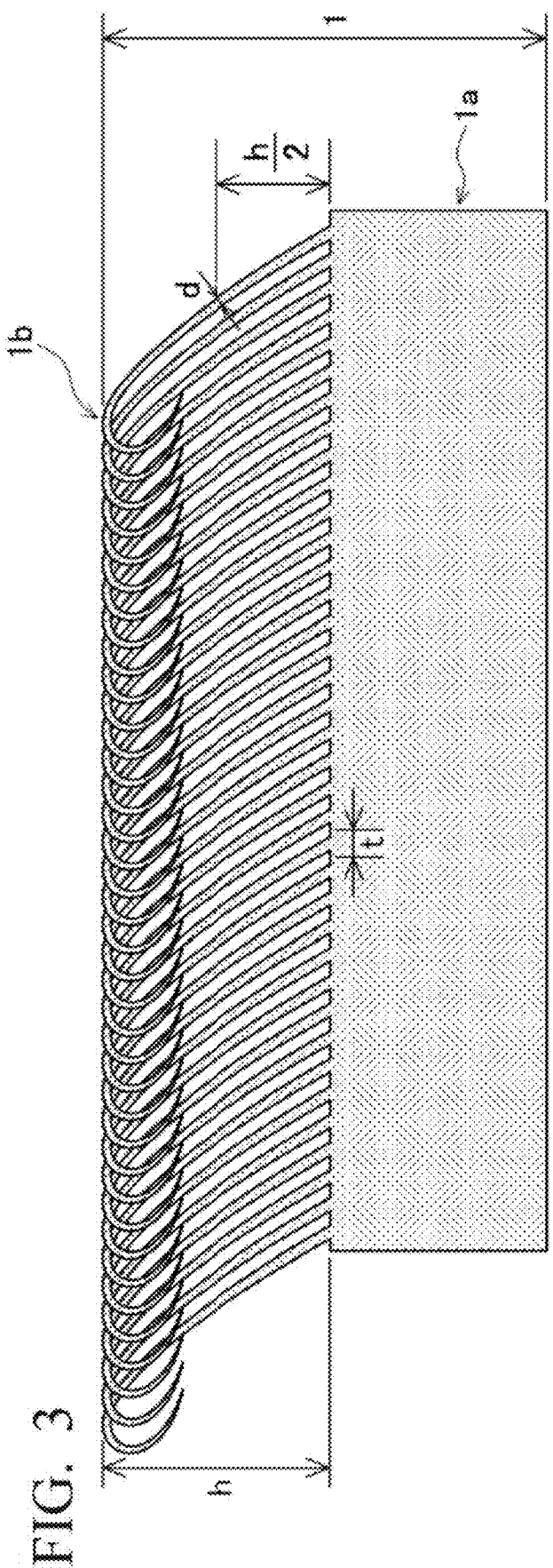
FIG. 3 is a vertical side cross-sectional schematic showing a further variation of the resin sheet according to the first embodiment of the present invention.
Figure 4:
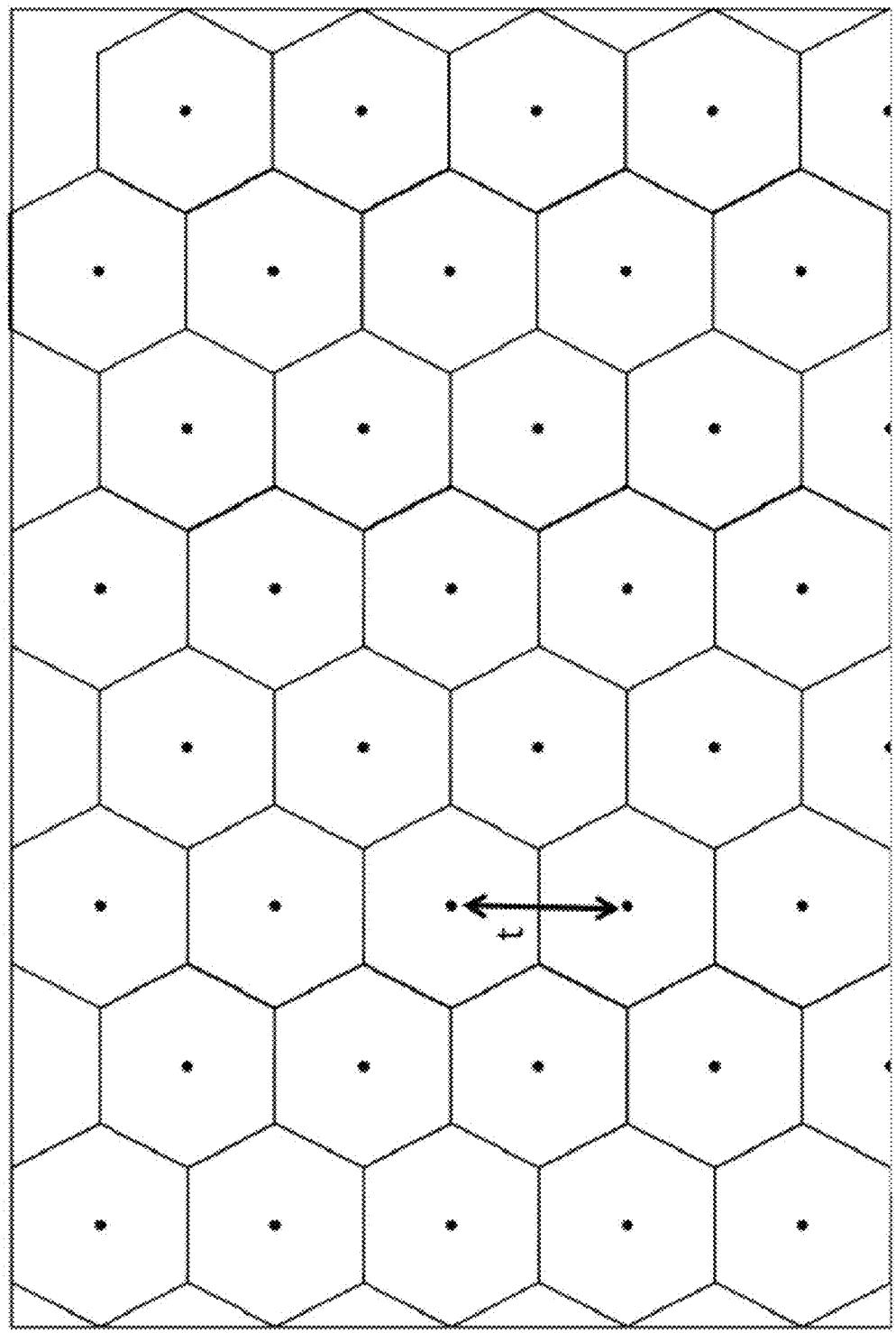
FIG. 4 is a schematic plan view of the resin sheet of FIG. 1.

When the hairlike bodies stand roughly straight with respect to the underlayer, the length of the hairlike bodies represents the height of the hairlike bodies. Meanwhile, when the hairlike bodies are slanted with respect to the underlayer as shown in FIG. 2 or the hairlike bodies have a portion that curls as shown in FIG. 3, the distance from the surface of the underlayer at the location of the hairlike bodies most removed from the surface of the underlayer is made the height of the hairlike bodies.

Cross-sectional slices were cut at three random locations on the resin sheet and the height of 10 hairlike bodies on each sample measured, and the arithmetic mean value of the 30 measurements can be used as the average height of the hairlike bodies.

The average diameter (d) of the hairlike bodies is preferably 1-50 µm and more preferably 5-30 µm. By setting the average diameter of the hairlike bodies to no less than 1 µm, a good tactile sensation can be ensured and by setting the average diameter of the hairlike bodies to no greater than 50 µm, a good tactile sensation such as moistness, softness, and fluffiness is obtained. The diameter at mid-height (h/2) of the hairlike bodies is measured at a number of locations on the resin sheet and the arithmetic mean value of the measurements is used as the average diameter of the hairlike bodies.

Further, the aspect ratio of the hairlike bodies when the hairlike bodies are standing roughly straight with respect to the underlayer can be represented as (average height of the hairlike bodies/average diameter of the hairlike bodies). When the hairlike bodies are slanted with respect to the underlayer or the hairlike bodies have a portion that curls, the aspect ratio of the hairlike bodies can be represented as (average length of the hairlike bodies/average diameter of the hairlike bodies). The length of the hairlike bodies is measured at a number of locations on the resin sheet and the arithmetic mean value of the measurements can be used as the average length of the hairlike bodies. In any case, the aspect ratio of the hairlike bodies is preferably 2-1,200, more preferably 10-600, and yet more preferably 40-200. By setting the aspect ratio to no less than 2, a good tactile sensation can be ensured and by setting the aspect ratio to no greater than 1,200, a good tactile sensation such as moistness, softness, and fluffiness is obtained.

Meanwhile, the average bottom surface diameter of the hairlike bodies can also be made a standard for the aspect ratio. The average bottom surface diameter of the hairlike bodies is preferably 10-150 µm. The average bottom surface diameter of the hairlike bodies is a value in which the spacing between neighboring hairlike bodies is measured at a number of locations on the resin sheet and the arithmetic mean value of the measurements is used. The aspect ratio when the bottom surface diameter of the hairlike bodies is made the standard is preferably 0.6-120. By setting the aspect ratio to no less than 0.6, a good tactile sensation can be ensured and by setting the aspect ratio to no greater than 120, a good tactile sensation such as moistness, softness, and fluffiness is obtained.

The average spacing (t) between the hairlike bodies is preferably 20-200 µm and more preferably 40-150 µm. The spacing of the hairlike bodies means the distance from the center of the root of a hairlike body to the center of the root of a neighboring hairlike body. By setting the average spacing to no less than 20 µm, a good tactile sensation is ensured and by setting the average spacing to no greater than 200 µm, a good tactile sensation such as moistness, softness, and fluffiness is obtained. The average spacing of the hairlike bodies is a value in which the spacing between neighboring hairlike bodies is measured at a number of locations on the resin sheet and the arithmetic mean value of the measurements is used.

The shape of the hairlike bodies is not particularly limited and may be configured to extend hairlike in a direction away from the underlayer in a shape in which the hairlike bodies gradually thin approaching the tip or in which a swelling is formed at the tip. In short, the hairlike bodies may have a shape in which the cross-sectional area gradually shrinks as the hairlike bodies deviate from the underlayer and then once again increases when the shape terminates. Further, the shape of the tip part of the hairlike bodies may be bud-shaped or mushroom-shaped. Moreover, the hairlike bodies may have a portion positioned at the base end extending in a direction away from the underlayer, a portion that extends from the portion positioned at the base end and is curved based on a fixed curvature or a curvature that gradually changes, and furthermore, a portion that is wound in a helix shape or a spiral shape. In this case, the tip parts of the hairlike bodies may have a shape that is folded inward. By having such a shape, a better tactile sensation is expressed. Further, due to the bud-shaped or mushroom-shaped portion being hollow, a better tactile sensation is expressed. When forming a bud-shaped or mushroom-shaped portion at the hairlike tips, it is preferable that ratio of the average diameter of the width of the bud shape or mushroom shape with respect to the average diameter of the hairlike bodies be no less than 1.1. The height of the bud shape or mushroom shape is preferably no less than 7 µm. The average diameter of the hairlike bodies and the average diameter of the width and the height of the bud shape or mushroom shape are measured from a scanning electron microscope photograph and the arithmetic mean value is used. The hairlike bodies comprise a thermoplastic resin. The same resins that can be used in the underlayer can be used as the thermoplastic resin.

Resin Sheet

In the present embodiment, the thickness of the resin sheet is the sheet thickness combining the average height of the hairlike bodies and the average thickness of the underlayer. The sheet thickness is preferably 150-1,500 µm and more preferably 300-1,000 µm. By setting the thickness to no less than 150 µm, a good tactile sensation can be sufficiently ensured and by setting the thickness to no greater than 1,500 µm, manufacturing costs can be suppressed.

In the present embodiment, the "tactile sensation" means the feeling and texture of the surface of the resin sheet.

When touching the surface of the resin sheet, whether comfortableness is felt is judged and, when felt, a good specific texture such as moistness, softness, or fluffiness is made the good tactile sensation. Further, the good tactile sensation can be specified by, other than a sensory evaluation of the texture, etc., the previously discussed aspect ratio, the ratio of the static friction coefficient with respect to the dynamic friction coefficient of the resin sheet, the value of the feeling of coldness or warmth to the touch, and the hardness of the resin.

The dynamic friction coefficient of the resin sheet is preferably 0.05-0.80 and more preferably 0.15-0.60. By setting the dynamic friction coefficient of the resin sheet to no greater than 0.8, a good tactile sensation can be ensured. Further, by setting the dynamic friction coefficient of the resin sheet to no less than 0.05, a good tactile sensation such as moistness, softness, and fluffiness can be expressed.

The feeling of coldness or warmth to the touch of the resin sheet can be expressed by the heat transfer speed q-max when in contact and a larger q-max value represents a colder feeling and a smaller q-max value represents a warmer feeling. Consequently, q-max is preferably 0.005-0.500 $W/cm^2$ and more preferably 0.200-0.450 $W/cm^2$. By setting the heat transfer speed of the resin sheet when in contact to no less than 0.005 $W/cm^2$, a good tactile sensation such as moistness, softness, and fluffiness can be ensured. Further, by setting the heat transfer speed of the resin sheet when in contact to no greater than 0.500 $W/cm^2$, a good tactile sensation such as moistness, softness, and fluffiness can be expressed.

Second Embodiment

Figure 5:
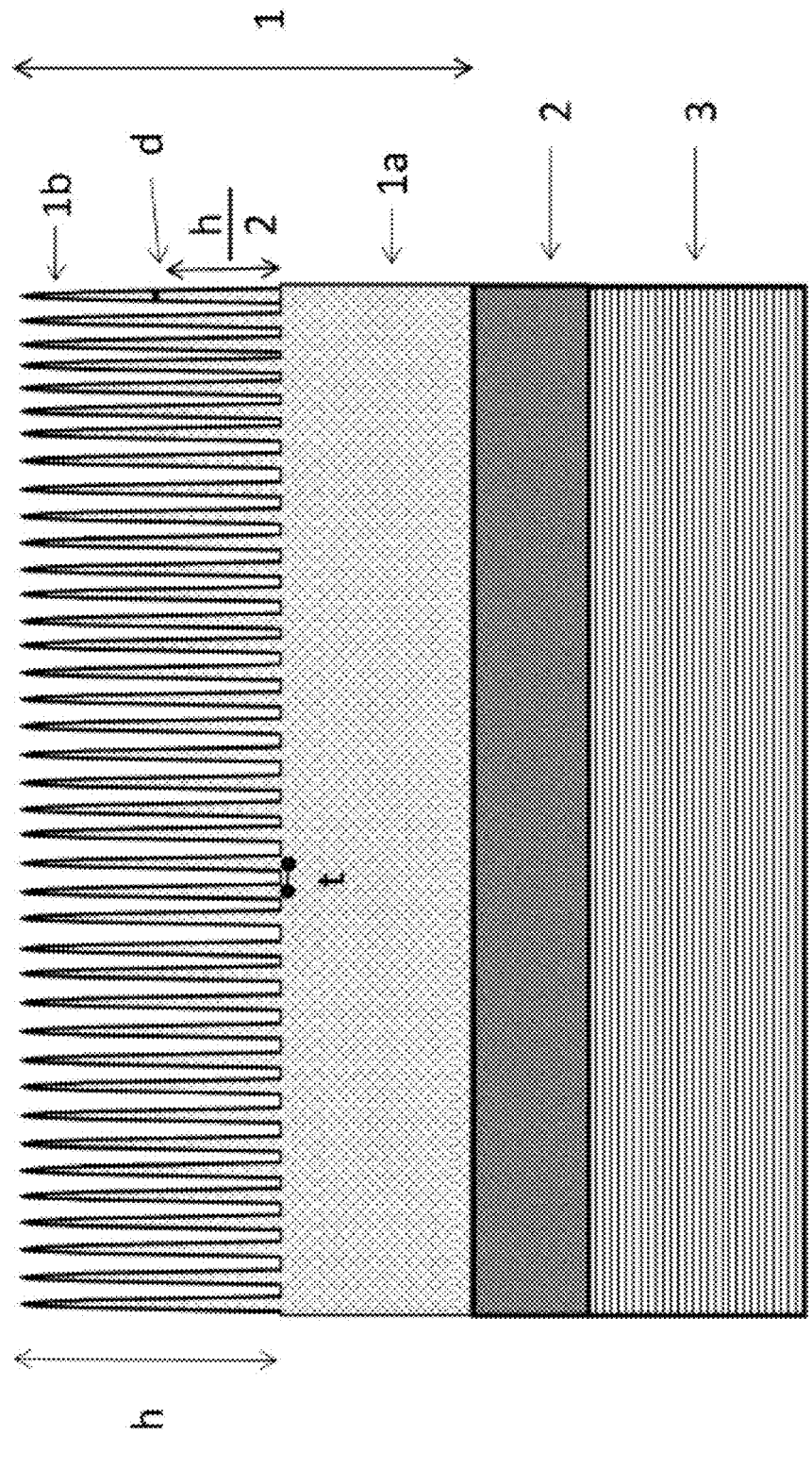
FIG. 5 is a vertical side cross-sectional schematic showing the layer structure of a resin sheet according to the second embodiment of the present invention.

An example of the resin sheet according to the second embodiment of the present invention is a resin sheet in which a sealant resin layer (2) is formed between the underlayer (1) and the substrate layer (3), as shown in FIG. 5. That is, the layer configuration of the resin sheet according to the second embodiment is, from top to bottom, the hairlike bodies and the underlayer (1), the sealant resin layer (2), and the substrate layer (3). Here, the hairlike bodies are the same as those explained in the first embodiment, so explanation thereof is omitted. However, the thickness of the hairlike bodies and the underlayer represented by the total of the average height of the hairlike bodies and the average thickness of the underlayer is preferably 150-900 μm. By setting the thickness to no less than 150 μm, a good tactile sensation can be ensured and by setting the thickness to no greater than 900 μm, production costs can be suppressed.

Substrate Layer

The substrate layer is preferably a thermoplastic resin such as a styrene-based resin, an olefin-based resin, a polyester-based resin, a nylon-based resin, an acrylic resin, or a thermoplastic elastomer. Further, when laminating, there is lamination by coextrusion molding and lamination by extrusion laminate molding or dry laminate molding using a nonoriented film or a biaxially oriented film.

Polyethylene terephthalate, polybutylene terephthalate, polyethylene-2,6-naphthalate, polymethylene terephthalate, a polyester resin in which, as copolymerization components, for example, a diol component such as diethylene glycol, neopentyl glycol, and polyalkylene glycol, a dicarboxylic acid component such as adipic acid, sebacic acid, phthalic acid, isophthalic acid, and 2,6-naphthalene dicarboxylic acid, etc. are copolymerized, etc. can be used as the polyester-based resin.

A lactam polymer such as caprolactam and laurolactam, a polymer of an aminocarboxylic acid such as 6-aminocaproic acid, 11-aminoundecanoic acid, and 12-aminododecanoic acid, a polycondensate of a diamine unit such as an aliphatic diamine such as hexamethylenediamine, decamethylenediamine, dodecamethylenediamine, and 2,2,4- or 2,4-4-trimethylhexamethylenediamine, an alicyclic diamine such as 1,3- or 1,4-bis(aminomethyl)cyclohexane or bis(p-aminocyclohexylmethane), or an aromatic diamine such as m- or p-xylylenediamine, and a dicarboxylic acid unit such as an aliphatic dicarboxylic acid such as adipic acid, suberic acid, and sebacic acid, an alicyclic dicarboxylic acid such as cyclohexanedicarboxylic acid, or an aromatic dicarboxylic acid such as terephthalic acid and isophthalic acid, and copolymers, etc. thereof can be used as the nylon-based resin. For example, there are nylon 6, nylon 9, nylon 11, nylon 12, nylon 66, nylon 610, nylon 611, nylon 612, nylon 6T, nylon 6I, nylon MXD6, nylon 6/66, nylon 6/610, nylon 6/6T, nylon 6I/6T, etc. and among these, nylon 6 and nylon MXD6 are suitable.

If the polymer is a vinyl polymer based on methacrylic ester monomers, it can be used as an acrylic resin and the structure, etc. thereof is not particularly limited. As the methacrylic ester monomers, there are, for example, methyl methacrylate, ethyl methacrylate, propyl methacrylate, butyl methacrylate, pentyl methacrylate, hexyl methacrylate, etc. Further, the alkyl group such as a propyl group, butyl group, pentyl group, or hexyl group in the methacrylic ester monomer may be a straight chain or may be branched. The methacrylic ester resin may be a homopolymer of a methacrylic ester monomer or a copolymer of multiple methacrylic ester monomers and may have monomer units derived from known vinyl compounds other than methacrylic ester such as ethylene, propylene, butadiene, styrene, α-methylstyrene, acrylonitrile, and acrylic acid.

The substrate layer may be alloyed with the abovementioned thermoplastic resins at any ratio in a range that does not inhibit the effects of the present invention, as necessary. Furthermore, the substrate layer may contain other additives. Additives such as water/oil repellents, colorants such as pigments or dyes, mold release agents such as silicone oil or alkyl ester-based agents, fibrous reinforcement agents such as glass fibers, granular lubricants such as talc, clay, or silica, a salt compound of sulfonic acid and an alkali metal or the like, antistatic agents, ultraviolet absorbing agents, flame retardants, and antibacterial agents can be added as the other additives in a range that does not inhibit the effects of the present invention. Further, scrap resin generated in the resin sheet manufacturing process can be mixed and used.

Sealant Resin Layer

The sealant resin layer is for causing adhesion between the underlayer and the substrate layer to be expressed and a modified olefin-based resin, a hydrogenated styrene-based thermoplastic elastomer, etc. can be used as resin components.

Olefin-based resins such as olefins with about 2-8 carbon atoms such as ethylene, propylene, and butene-1, copolymers of these olefins and other olefins with about 2-20 carbon atoms such as ethylene, propylene, butene-1,3-methylbutene-1, pentene-1,4-methylpentene-1, hexene-1, octene-1, and decene-1 or copolymers of these olefins and vinyl compounds such as vinyl acetate, vinyl chloride, acrylic acid, methacrylic acid, acrylic ester, methacrylic ester, and styrene, and olefin-based rubbers such as ethylene-propylene copolymers, ethylene-propylene-diene copolymers, ethylene-butene-1 copolymers, and propylene-butene-1 copolymers modified under graft reaction conditions with unsaturated carboxylic acids such as acrylic acid, methacrylic acid, crotonic acid, isocrotonic acid, maleic acid, fumaric acid, itaconic acid, citraconic acid, and tetrahydrophthalic acid or derivatives of the acids such as halides, amides, imides, anhydrides, and esters, specifically, malonyl chloride, maleimide, maleic anhydride, citraconic anhydride, monomethyl maleate, dimethyl maleate, and glycidyl maleate can be used as the modified olefin-based resin.

Among these, an "ethylene-propylene-diene copolymer" or ethylene-propylene or butene-1 copolymer rubber modified with an unsaturated dicarboxylic acid or an anhydride thereof, in particular maleic acid or an anhydride thereof, is suitable.

A hydrogenated copolymer of a styrene-based monomer and butadiene or isoprene, a hydrogenated styrene-butadiene-styrene block copolymer (styrene-ethylene/butylene-styrene block copolymer), a hydrogenated styrene-isoprene-styrene block copolymer (styrene-ethylene/propylene-styrene block copolymer), etc. can be used as the hydrogenated styrene-based thermoplastic elastomer and, in particular, a styrene-ethylene/butylene-styrene block copolymer is preferable.

The average thickness of the sealant resin layer is preferably 20-90 μm and more preferably 40-80 μm. By setting the average thickness to no less than 20 μm, interlayer separation occurring between the underlayer and the substrate layer can be suppressed and by setting the average thickness to no greater than 90 μm, production costs can be suppressed.

Third Embodiment

Figure 6:
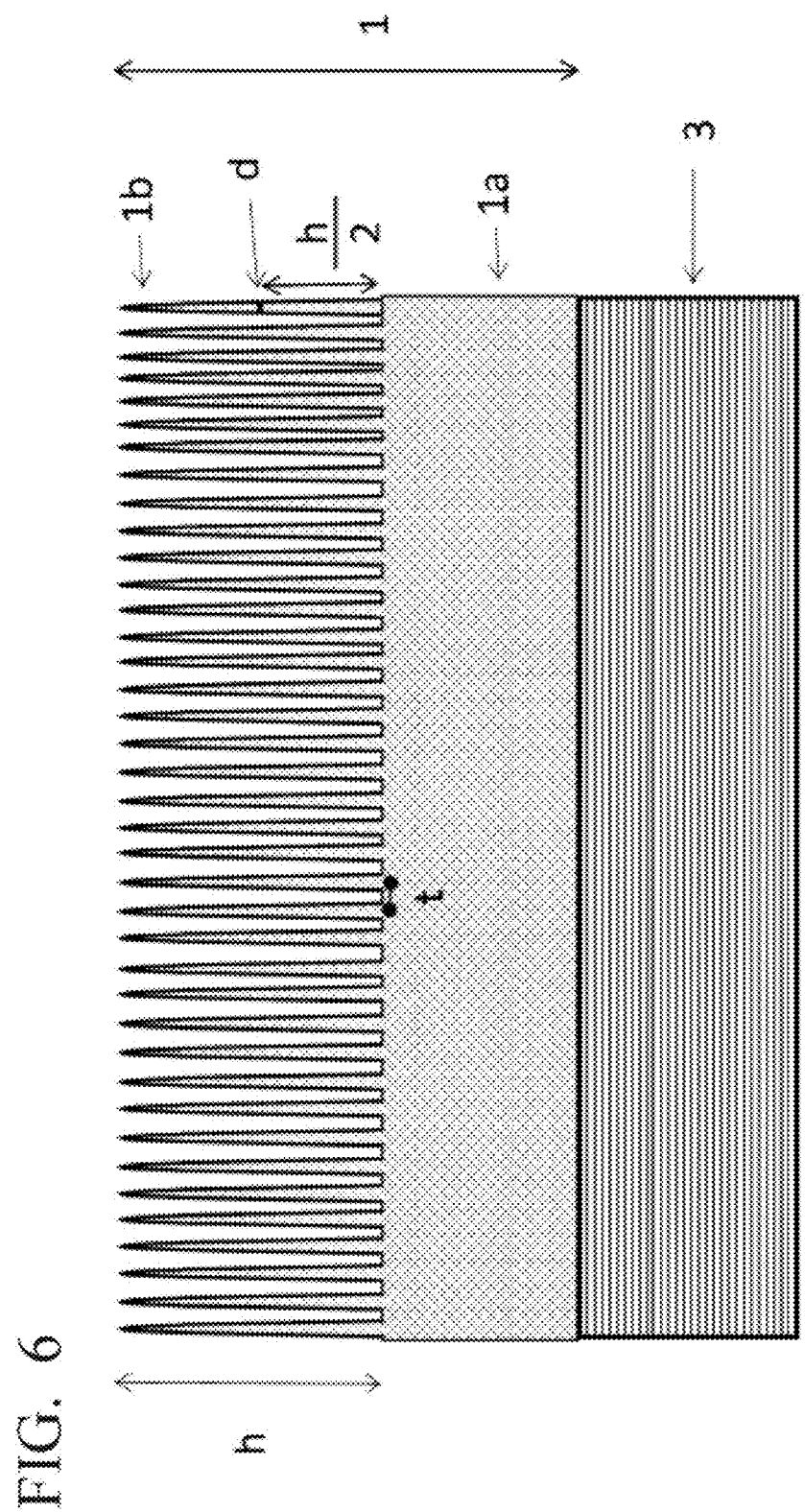
FIG. 6 is a vertical side cross-sectional schematic showing the layer structure of a resin sheet according to the third embodiment of the present invention.

The resin sheet according to a third embodiment of the present invention is one in which the hairlike bodies and base layer (1) and the substrate layer (3) are directly laminated without using the sealant resin sheet (2) indicated in the second embodiment, as shown in FIG. 6. That is, the layer configuration of the resin sheet according to the third embodiment is, from top to bottom, the hairlike bodies and underlayer (1)/the substrate layer (3) and is the layer configuration for the thermoplastic resin sheet according to the second embodiment from which the sealant resin layer has been removed. Here, the hairlike bodies and underlayer are the same as those in the first embodiment and the second embodiment, so explanation thereof is omitted. Meanwhile, the substrate layer (3) in the present embodiment is preferably a layer provided with sufficient adhesion with the underlayer.

Further, in the resin sheet according to the third embodiment, using a thermoplastic resin with excellent adhesion with the underlayer as the substrate layer is preferable. For example, when the underlayer is a fluorine-based resin, an acrylic resin can be used and when the underlayer is an olefin-based resin, a styrene-based resin composition to which a hydrogenated styrene-based thermoplastic elastomer has been added can be used. When using an impact-resistant polystyrene resin and a hydrogenated styrene-based thermoplastic elastomer in combination, adding 5-10 parts by mass of the hydrogenated styrene-based thermoplastic elastomer with respect to 90-95 parts by mass of the impact-resistant polystyrene resin is preferred. In this case, by setting the amount of the hydrogenated styrene-based thermoplastic elastomer added to no less than 5 parts by mass, adhesion with the underlayer becomes sufficient and the occurrence of interlayer separation can be suppressed, and by setting the amount added to no greater than 10 parts by mass, the production costs can be suppressed.

Resin Sheet Manufacture

The manufacturing method of the resin sheet according to the present invention comprises forming hairlike bodies by melt extruding, from a die with an extrusion molding technique, a thermoplastic resin characterized by having, on a log-log graph having elongational viscosity $\eta(t)$ (unit: Pa·S) as measured at a strain rate of 0.5 (unit: $S^{-1}$) and at a temperature at which elongation is possible as the vertical axis and elongation time t (unit: S) as the horizontal axis, a region in which the slope (log $\eta$/log t) in the interval $0.1<t<1.0$ is no greater than 0.5 and by the temperature range wherein the adhesive force in probe tack measurement is 0.05-0.25 $N/mm^2$ at least partially overlapping with the temperature at which elongation is possible, and casting using a transfer roll on which a relief process has been performed and a touch roll.

In certain embodiments, the manufacturing method for the resin sheet essentially comprises the two steps described above and a resin sheet expressing a good tactile sensation can be provided by casting the thermoplastic resin in a sheet form without requiring an additional step such as forming the hairlike bodies by stretching hairlike body protrusions with insufficient average height by combing, brushing, etc.

In the manufacture of a single layer sheet or a multilayer sheet, any resin sheet molding method can be used. For example, there are methods for melting and extruding raw resins using a single-screw extruder when the sheet is single layer and multiple single-screw extruders when the sheet is multilayer and obtaining a resin sheet with a T-die. When the sheet is multilayer, a feed block or a multi-manifold die can be used. Moreover, the layer configurations of the embodiments of the resin sheet of the present application are basically as discussed previously, but beyond these, for example, scrap material generated in a manufacturing process for the resin sheet or molded container of the present invention may be added to the substrate layer and laminated as a further layer so long as degradation of the physical properties, etc. is not observed.

For example, when using an extrusion molding technique, the resin sheet according to the present invention can be manufactured by extruding a resin sheet with a T-die technique and casting with a transfer roll on which a relief process has been performed and a touch roll so as to add the shapes of hairlike bodies to a surface of the resin sheet.

A roll in which a micro-relief has been applied regularly on a surface thereof with a laser engraving or electrocasting method, an etching method, a mill engraving method, etc. can be used as the transfer roll on which a relief process has been performed. Here, regular means that the relief is in an arranged state that is not random, that is, is arranged in an orderly fashion in one direction or in two directions. The arrangement of the relief in an embodiment can be selected from a grid arrangement arranged vertically and horizontally, a staggered arrangement, etc. As the shape of the relief part, there are, for example, if a concave shape, funnel-shapes (cone, quadrangular pyramid, triangular pyramid, hexagonal pyramid, etc.), semicircles, rectangles (quadrangular prism), etc. As the size thereof, the diameter of the opening of the concavity, the depth of the concavity, the spacing of the concavity shapes, etc. are from micrometers to hundreds of micrometers. The spacing of the hairlike bodies can be adjusted by adjusting the spacing of the concavities on the transfer roll and the height of the hairlike bodies can be adjusted by adjusting the depth of the concavities on the transfer roll, and the tactile sensation can also be adjusted thereby.

Further, it is preferable that a relief process with a high aspect ratio be performed on the transfer roll surface. For example, the aspect ratio (concavity depth/concavity opening diameter) when working concavity shapes into the transfer roll surface is preferably 0.5-6.0. In performing a high aspect ratio relief process on the transfer roll surface, in comparison with an etching method, a blasting method, a mill engraving method, etc., a laser engraving method or an electrocasting method is suitable when performing fine work in the depth direction and thus is particularly suitably used.

At least part of the transfer roll surface is ceramic sprayed and it is preferable that a relief process is performed on the ceramic-sprayed surface. Due to ceramic spraying, the workability of the relief is improved and the resin sheet can be stably released from the transfer roll.

For example, metals, ceramics, etc. can be used as the material of the transfer roll and those wherein the surface thereof has been sprayed or plated with chromium oxide (chromia), alumina, titania, alumina-titania, or zirconia can be used.

Meanwhile, various materials can be used as the touch roll, for example, a roll made from silicone-based rubber, NBR-based rubber, EPT-based rubber, butyl rubber, chloroprene rubber, or fluorine rubber can be used. In certain embodiments, a touch roll with a rubber hardness (JIS K 6253) of 40-100 can be used. Further, a Teflon® layer may be formed on the surface of the touch roll.

The resin sheet of the present embodiment can be manufactured by using a roll set of the above transfer roll and touch roll.

In certain embodiments, the resin sheet of the present embodiment can be manufactured by adjusting the temperature of the transfer roll to the temperature of the thermoplastic resin at which elongation is possible and the temperature at which the adhesive force of the thermoplastic resin in probe tack measurement is 0.05-0.25 N/mm² or a temperature 0-80° C. lower than that and casting with a pinch pressure between the transfer roll and the touch roll of 30-120 Kg/cm². The cast resin sheet is taken in at a line speed of 0.5-30 m/minute, 1-5 m/minute, or 2-4 m/minute using a pinch roll, etc.

By using a thermoplastic resin characterized by having, on a log-log graph having elongational viscosity η(t) (unit: Pa·S) as measured at a strain rate of 0.5 (unit: S⁻¹) and at a temperature at which elongation is possible as the vertical axis and elongation time t (unit: S) as the horizontal axis, a region in which the slope (log η/log t) in the interval 0.1<t<1.0 is no greater than 0.5 and by the temperature range in which the adhesive force in probe tack measurement is 0.05-0.25 N/mm² at least partially overlapping with the temperature at which elongation is possible, a resin sheet having a surface shape in which the average height of the hairlike bodies is no less than 100 μm and no greater than 1,200 μm, the average diameter of the hairlike bodies is no less than 1 μm and no greater than 50 μm, and the average spacing of the hairlike bodies is no less than 20 μm and no greater than 200 μm can be obtained. In cases in which the slope (log η/log t) in the interval 0.1<t<1.0 in a log-log graph having elongational viscosity η(t) (unit: Pa·S) as measured at a strain rate of 0.5 (unit: S⁻¹) and at a temperature at which elongation is possible as the vertical axis and elongation time t (unit: S) as the horizontal axis is not 0.5 or less, it is thought that the elastic deformation behavior of the resin strongly causes hairlike bodies not to be formed (even if stretched once, these shrink). Further, in cases in which, as conditions in which the temperature range in which the adhesive force in probe tack measurement is 0.05-0.25 N/mm² does not overlap with the temperature at which elongation is possible, the temperature at which elongation is possible increases and does not overlap, adhesion to the relief transfer roll at the same temperature range becomes too strong and trouble winding the resin sheet on the transfer roll arises and this is expected to be connected to poor external appearance of the resin sheet due to strongly peeling the sheet from the transfer roll. Meanwhile, in cases in which the temperature at which elongation is possible is too low and does not overlap, adhesion to the relief transfer roll in the same temperature range is insufficient and it is expected that a resin sheet having a surface shape in which the average height of the hairlike bodies is no less than 100 μm and no greater than 1,200 μm, the average diameter of the hairlike bodies is no less than 1 μm and no greater than 50 μm, and the average spacing of the hairlike bodies is no less than 20 μm and no greater than 200 μm cannot be obtained.

Further, while the above embodiments were shown specifically, the present invention is not limited thereto.

Molded Product

The molded product of the present invention is formed by molding the resin sheet of the present invention. Conventional techniques cannot handle three-dimensional molding, but the hairlike body sheet of the present invention comprises a thermoplastic resin, so handling of general molding is possible. As the molding method, there are general vacuum molding and pressure molding, and as applications thereof, a method for heating and softening a resin sheet in vacuum and overlaying on (molding to) a surface of an existing molded product by opening under atmospheric pressure, etc., but the molding method is not limited thereto. Further, publicly known sheet heating methods such as radiation heating with an infrared heater or the like, which is non-contact heating, can be adapted as a method to heat and soften a sheet before molding. In vacuum/pressure molding in certain embodiments, for example, a resin sheet is molded on to an existing molded product surface after heating at 60-140° C. for 20-480 seconds and can be stretched to 1.05-1.50 times depending on the surface shape.

Product

The resin sheet to which the hairlike bodies according to the present invention are added to the surface thereof can be applied to a use requiring the good tactile sensation indicated above. For example, the resin sheet of the present invention can be applied to interior materials of automobiles, electronic device cladding, cosmetic container members, stationery members, etc.

As interior materials of automobiles, there are the portions of the automobile interior that hands touch such as the steering wheel, dashboard, levers, and switches. For example, an interior material in which the abovementioned resin sheet is attached to a publicly known instrument panel or pillar (for example, JP 2009-184421 A) could be raised. By attaching the resin sheet, an interior material to which a good tactile sensation has been added can be configured. As the material of the resin sheet to be attached, in consideration of weather resistance and chemical resistance, an olefin-based resin, a vinyl chloride-based resin, or a urethane-based elastomer is preferable. The method for sticking the resin sheet and the interior material together is not particularly limited.

As electronic device cladding, there are transmitter housings for keyless entry systems, smartphone housings, smartphone cases, music player cases, game console housings, digital camera housings, electronic notebook housings, calculator housings, tablet housings, mobile computer housings, keyboards, mice, etc. For example, a publicly known portable transmitter housing for a keyless entry system (for example, JP 2005-228911 A) to which the resin sheet of the present application has been attached could be raised. By attaching the resin sheet, a portable transmitter to which a good tactile sensation has been added can be configured. As the material of the resin sheet to be attached, an olefin-based resin or a urethane-based elastomer is preferable. The method for sticking the resin sheet and the housing together is not particularly limited.

As a cosmetic container member, there are containers for face cream, pack cream, foundation, and eyeshadow and, for example, a cosmetic container in which the resin sheet of the present application has been attached to a lid member of a publicly known container for foundation (JP 2017-29608 A) could be raised. By attaching the resin sheet, a cosmetic container to which a good tactile sensation has been added can be configured. As the material of the resin sheet to be attached, an olefin-based resin or a urethane-based elastomer is preferable. The method for attaching the resin sheet is not particularly limited.

As a stationery member, there are book covers, notebook covers, pen case covers, etc. and, for example, a book cover to which a good tactile sensation and waterproofing has been added could be configured by manufacturing a publicly known book cover (for example, JP 2007-246122 A) using the sheet of the present invention. Further, the form of the book cover is not particularly limited. As the material of the sheet, an olefin-based resin or a urethane-based elastomer is preferable. The method for manufacturing using the resin sheet is not particularly limited.

Furthermore, a hairlike body sheet in which words or a pattern are printed on the surface of the hairlike bodies with a general printing method (an offset printing method, a gravure printing method, a flexographic printing method, a screen printing method, foil stamping, etc.) can be manufactured and applied to the above use. The material of the resin sheet to be printed on is not particularly limited, but it is preferable that the printability with the ink used in printing be considered.

Further, a laminated body in which the resin sheet of the present invention is laminate molded (dry laminate molded or extrusion laminate molded) with a printed article on which words, a pattern, etc. are printed (such as paper or a metal thin film) or a non-woven cloth, etc. can be manufactured, for example, a business card with a tactile sensation can be manufactured by laminate molding to the printing surface of the business card. The material of the resin sheet to be laminated is not particularly limited.

EXAMPLES

The present invention shall be explained in more detail below using examples and comparative examples, but the present invention is not at all limited by the details of the examples, etc.

The raw materials used in the examples, etc. are as follows.

(1) Hairlike Bodies and Underlayer
- (A) LLDPE (linear low-density polyethylene) "Neozex 45200" (manufactured by Prime Polymer Co., Ltd.)
- (B-1) TPU (urethane-based elastomer) "Elastollan ET880" (manufactured by BASF Japan Ltd.)
- (B-2) TPU (urethane-based elastomer) "Elastollan ET680" (manufactured by BASF Japan Ltd.)
- (B-3) TPU (urethane-based elastomer) "Elastollan ET3685" (manufactured by BASF Japan Ltd.)
- (C) Mold release agent "Waxmaster V" (manufactured by BASF Japan Ltd.)
- (D) ABS "GT-R-61A" (manufactured by Denka Company Limited)

Elongation Viscosity Measurement

Figure 7:
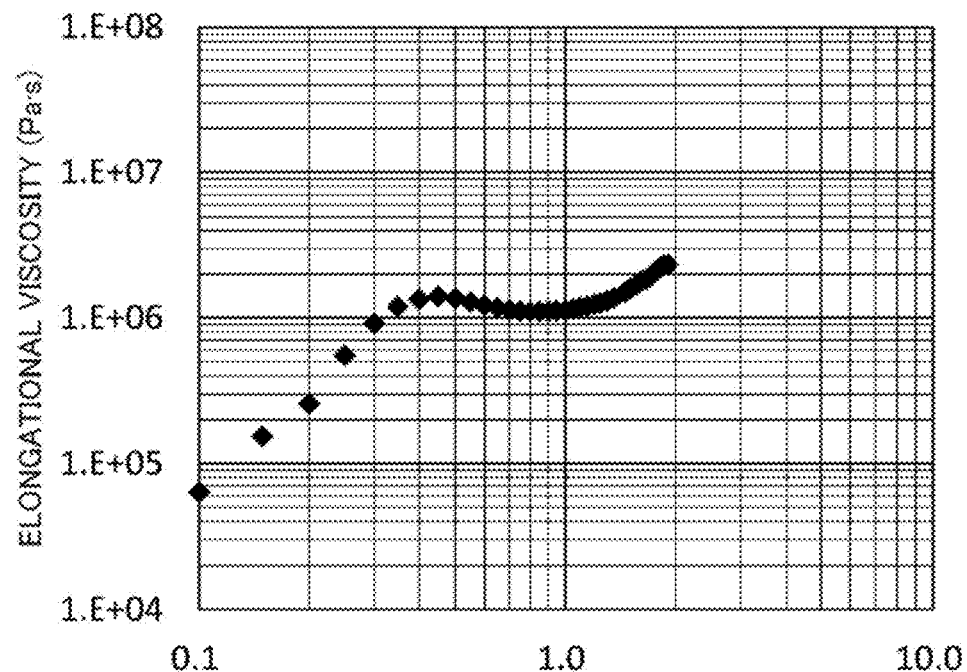
FIG. 7 shows the elongation viscosity measurement results of linear low-density polyethylene.
Figure 8:
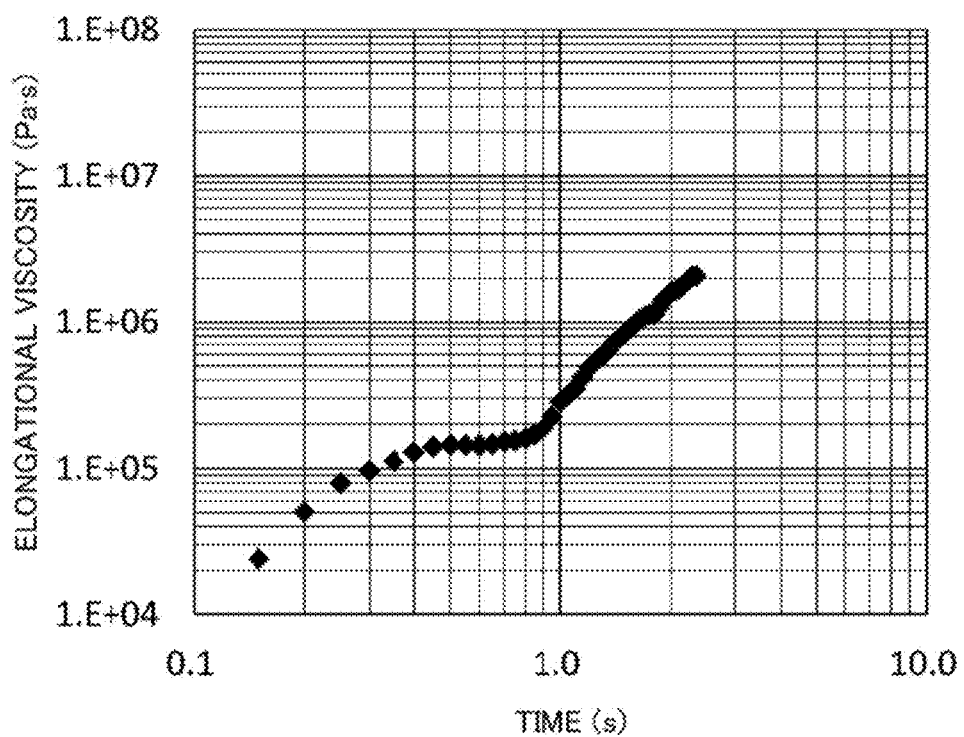
FIG. 8 shows the elongation viscosity measurement results of a urethane-based elastomer.

The elongation viscosity of the thermoplastic resin is measured by using a Mertens rheometer (manufactured by Toyo Seiki Seisaku-sho, Ltd.), retaining a 2 mm diameter cylindrical test piece on a roll with a width of 100 mm in an oil bath maintained at the temperature of the thermoplastic resin at which elongation is possible and stretching the test piece by rotating the roll at a fixed speed ($0.5\ S^{-1}$). The elongation viscosity of LLDPE (linear low-density polyethylene) "Neozex 45200" and TPU (urethane-based elastomer) "Elastollan ET880" were measured at 100° C. and 135° C., respectively. The results are shown in FIG. 7 and FIG. 8, respectively.

Adhesive Force Measurement

The adhesive force of the thermoplastic resin is measured using a Tackiness Tester (TAC-II) (manufactured by RHESCA Co., LTD.) and, under the conditions described below, placing a sample material on the stage, contacting the bottom surface of a columnar probe with the sample adhesive surface from above at a designated speed and with a designated control method (load control and penetration control), removing the probe from the sample at a set speed, and the resistance experienced by the probe due to the adhesive force at this time is measured as the load value.

Temperature: Temperature at which elongation is possible of each thermoplastic resin
Contact rate: 120 mm/minute
Release rate: 600 mm/minute
Contact load: 500 gf ($0.25\ N/mm^2$)
Contact time: 15 seconds
Probe shape: Columnar, ø5 mm
Probe material: Chromium oxide (surface of an SUS material probe sprayed with chromium oxide)

The evaluation methods for the various characteristics of the resin sheets and the molded products to which the resin sheets are vacuum/pressure molded manufactured in the examples and comparative examples are as follows.

(1) Average Height of the Hairlike Bodies, Average Diameter of the Hairlike Bodies, Average Spacing of the Hairlike Bodies, and Average Thickness of the Underlayer The height (h) of the hairlike bodies, the diameter (d) of the hairlike bodies, the spacing (t) of the hairlike bodies, and the thickness of the underlayer of the resin sheet were measured using a laser microscope VK-X100 (manufactured by KEYENCE CORPORATION). The measured samples were cross-sectional slices cut from the resin sheets at three random locations with a microtome. The average height of the hairlike bodies was measured by measuring the height of 10 hairlike bodies of each sample and calculating the arithmetic mean value of the 30 measurements. The average diameter of the hairlike bodies was measured by measuring the diameter of 10 hairlike bodies of each sample at mid-height (h/2) and calculating the arithmetic mean value of the 30 measurements. The average spacing of the hairlike bodies was measured by measuring the distance from the center of the root of one hairlike body to the center of the root of a neighboring hairlike body at 10 locations of each sample and calculating the arithmetic mean value of the 30 measurements. The average thickness of the underlayer was measured by measuring the thickness from the roots of the hairlike bodies to the other layer interface at 10 locations of each sample and calculating the arithmetic mean value of the 30 measurements.

(2) Good Tactile Sensation Sensory Evaluation

A sensory evaluation of the good tactile sensation was performed by having a total of 30 people, 15 men and 15 women, touch the resin sheets. When touching the surfaces of the resin sheets, whether comfortableness was felt was judged with "○" and "×" and when judged with "○", the resin sheet was evaluated with a specific texture such as moistness, softness, or fluffiness. When evaluated with the same texture by no less than 80% of the evaluators, the resin sheet was evaluated as having that texture. Further, whether the same texture was also maintained on the surface of the molded products which were vacuum/pressure molded using the resin sheets was evaluated.

(3) Ratio of Static Friction Coefficient With Respect to the Dynamic Friction Coefficient Using a static friction measurement instrument "TL201Ts (manufactured by Trinity-Lab Inc.)", the resin sheets were attached to the table thereof with the surface to which the hairlike bodies, etc. were added facing up. Using a contact made of urethane (durometer hardness: 32±2), the table was moved at a speed of 10 mm/second while applying a load of 100 g and the static friction coefficient and the dynamic friction coefficient were measured.

(4) Measuring Coldness or Warmth to the Touch (Heat Transfer Speed: Q-Max)

Using a finger robot thermolab (manufactured by KATO TECH CO., LTD.), the resin sheet samples were placed on the sample stage set to 20° C. for 5 minutes and after temperature adjustment of the resin sheets, contacted with a 30° C. contact temperature sensor (1 mm×1.5 mm), and the heat transfer speed (q-max) was measured over 0.2 seconds.

(5) Vacuum/Pressure Molding

The resin sheets were heated in vacuum with a double-sided vacuum molding machine (NGF-0709-S: manufactured by Fu-Se Vacuum Forming) and then a molded product was manufactured by vacuum/pressure molding the resin sheets to a surface of a smartphone cover prepared in atmosphere. The sheets were heated at 80° C. for 120 seconds and stretched to 1.5 times at the most stretched location.

Example 1

A resin sheet extruded with a T-die method using thermoplastic resin (A) and using a 65 mm single-screw extruder was cast using a metal transfer roll on which a relief process had been performed with chromium oxide spraying and a laser engraving method and which was adjusted to 60-150° C. and a silicone-based rubber touch roll having a rubber hardness of 70 which was adjusted to 10-90° C. and taken in at a line speed of 2-15 m/minute using a pinch roll. By doing so, resin sheets in which comfortableness is felt when touched were able to be obtained according to the compositions, thicknesses, and surface shapes indicated in Table 1.

Example 2

A dry blend of thermoplastic resin (B) and mold release agent (C) was streamed from a 40 mm single-screw extruder and thermoplastic resin (D) was streamed from a 65-mm single-screw extruder, and a resin sheet extruded with a T-die method was cast using a metal transfer roll on which a relief process had been performed with chromium oxide spraying and a laser engraving method and which was adjusted to 60-150° C. and a silicone-based rubber touch roll having a rubber hardness of 70 which was adjusted to 10-90° C. and taken in at a line speed of 2-15 m/minute using a pinch roll. By doing so, resin sheets in which comfortableness is felt when touched were able to be obtained according to the compositions, thicknesses, and surface shapes indicated in Table 1.

Comparative Examples 1 and 2

A dry blend of thermoplastic resin (B) and mold release agent (C) was streamed from a 40 mm single-screw extruder and thermoplastic resin (D) was streamed from a 65-mm single screw extruder, and a resin sheet extruded with a T-die method was cast using a metal transfer roll on which a relief process had been performed with chromium oxide spraying and a laser engraving method and which was adjusted to 60-150° C. and a silicone-based rubber touch roll having a rubber hardness of 70 which was adjusted to 10-90° C. and taken in at a line speed of 2-15 m/minute using a pinch roll. However, in the abovementioned transfer roll temperature range, adhesion to the resin was strong and trouble winding the resin sheet on the roll occurred, so the temperature was adjusted to the maximum temperature at which the resin roll is not wound on the transfer roll (no greater than 60° C.) and film-forming was performed and the compositions, thickness, and surface shapes at this time are described in Table 1. Under the present conditions, resin sheets satisfying the surface shape wherein the average height of the hairlike bodies is no less than 100 μm and no greater than 1,200 μm, the average diameter of the hairlike bodies is no less than 1 μm and no greater than 50 μm, and the average spacing of the hairlike bodies is no less than 20 μm and no greater than 200 μm were not obtained and comfortableness could not be felt when the surface was touched.

Evaluative testing of the characteristics was performed using the resin sheets obtained in the examples and comparative examples and the results are shown in Table 2.

TABLE 1

| | | Hairlike Bodies and Underlayer | | | | | Substrate Layer |
|---|---|---|---|---|---|---|---|
| | | LLDPE (A-1) | TPU (B-1) | TPU (B-2) | TPU (B-3) | Release Agent (C) | ABS (D) |
| Example 1 | Composition (mass %) | 100 | — | — | — | — | — |
| | Thickness (μm) | | 300 | | | | |
| Example 2 | Composition (mass %) | — | 95 | — | — | 5 | 100 |
| | Thickness (μm) | | 80 | | | | 325 |
| Comparative Example 1 | Composition (mass %) | — | — | 95 | — | 5 | 100 |
| | Thickness (μm) | | | 70 | | | 330 |
| Comparative Example 2 | Composition (mass %) | — | — | — | 95 | 5 | 100 |
| | Thickness (μm) | | | | 75 | | 330 |

TABLE 2

| | | Elongational Viscosity Measurement | | | | | | Elongation Temperature Range | Tackiness Measurement 0.05-0.25 N/m² | Overlap | Surface Shape Average Height of Hairlike Bodies (μm) |
|---|---|---|---|---|---|---|---|---|---|---|---|
| Example 1 | Molding Temperature (°C) | 100 | 105 | 110 | 115 | 120 | 125 | 105-120°C | 105-110°C | ○ | 320 |
| | Possibility of Elongation | x Rigid | ○ | ○ | ○ | ○ | x Molten | | | | |
| | Minimum value of slope (log η/log t) in the interval 0.1 < t < 1.0 | | −0.45 | −0.66 | 0.03 | −0.18 | | | | | |
| Example 2 | Molding Temperature (°C) | 120 | 125 | 130 | 135 | 140 | 145 | 150 | 130-145°C | 115-139°C | ○ | 165 |
| | Possibility of Elongation | x Rigid | ○ | ○ | ○ | ○ | ○ | x Molten | | | | |
| | Minimum value of slope (log η/log t) in the interval 0.1 < t < 1.0 | | x 0.63 | ○ 0.46 | ○ 0.37 | ○ 0.24 | ○ −0.11 | | | | | |
| Comparative Example 1 | Molding Temperature (°C) | 120 | 125 | 130 | 135 | 140 | 145 | | 130-140°C | 103-122°C | x | 60 |
| | Possibility of Elongation | x Rigid | ○ | ○ | ○ | ○ | x Molten | | | | | |
| | Minimum value of slope (log η/log t) in the interval 0.1 < t < 1.0 | | x 0.54 | ○ 0.31 | ○ −0.28 | ○ −1.57 | | | | | | |
| Comparative Example 2 | Molding Temperature (°C) | 105 | 110 | 115 | 120 | 125 | 130 | | 110-125°C | 96-103°C | x | 42 |
| | Possibility of Elongation | x Rigid | ○ | ○ | ○ | ○ | x Molten | | | | | |
| | Minimum value of slope (log η/log t) in the interval 0.1 < t < 1.0 | | ○ −0.18 | ○ −1.36 | ○ −1.06 | ○ −1.18 | | | | | | |

| | | Surface Shape | | Good Tactile Sensation | | Texture of Molded Product | Resin Sheet Evaluation | |
|---|---|---|---|---|---|---|---|---|
| | | Average Diameter of Hairlike Bodies (μm) | Average Spaing of Hairlike Bodies (μm) | Texture When "Comfortableness" Felt | "Comfortableness" When Touched | | Heat Transfer Speed (q-max) (W/cm²) | Dynamic Friction Coefficient |
| Example 1 | Molding Temperature (°C) Possibility of Elongation Minimum value of slope (log η/log t) in the interval 0.1 < t < 1.0 | 15 | 60 | ○ | Fluffy | Dry | 0.35 | 0.32 |

TABLE 2-continued

| | | | | | | | | |
|---|---|---|---|---|---|---|---|---|
| Example 2 | Molding Temperature(° C.) | 35 | 60 | ○ | Moist | Moist | 0.42 | 0.56 |
| | Possibility of Elongation | | | | | | | |
| | Minimum value of slope (log η/log t) in the interval 0.1 < t < 1.0 | | | | | | | |
| Comparative Example 1 | Molding Temperature(° C.) | 30 | 60 | x | Coarse | Smooth (Tacky Feeling) | 0.68 | 0.85 |
| | Possibility of Elongation | | | | | | | |
| | Minimum value of slope (log η/log t) in the interval 0.1 < t < 1.0 | | | | | | | |
| Comparative Example 2 | Molding Temperature(° C.) | 32 | 60 | x | Smooth (Tacky Feeling) | Smooth (Tacky Feeling) | 0.75 | 1.13 |
| | Possibility of Elongation | | | | | | | |
| | Minimum value of slope (log η/log t) in the interval 0.1 < t < 1.0 | | | | | | | |

The following is clear from the results shown in Table 2.

Results satisfying the evaluation standards pertaining to good tactile sensation were obtained with the resin sheets of Examples 1 and 2. Satisfactory results in the dynamic friction coefficient and heat transfer speed were also obtained. In contrast, resin sheets on which hairlike bodies with an average height of no less than 100 μm and no greater than 1,200 μm were not obtained with the resin sheets in Comparative Examples 1 and 2.

Further, the shapes of the resin sheets obtained in Examples 1 and 2 were observed under the following conditions with a field emission-type scanning electron microscope (FE-SEM, JEOL, Ltd., JSM-7001F).

It was observed from the scanning electron microscope images that the hairlike bodies do not tangle with one another and extend in a fixed direction. Further, the hairlike bodies had a configuration extending hairlike in a direction away from the underlayer and in which swellings are formed at the tips thereof. That is, the shape of the hairlike bodies was a shape in which the cross-sectional area gradually shrinks as the hairlike bodies deviate from the underlayer and then once again increases when the shape terminates. Further, it was observed that the shape of the tip part of the hairlike bodies was bud-shaped or mushroom-shaped and the bud-shaped or mushroom-shaped parts were partially hollow. Furthermore, shapes in which the hairlike bodies are slanted with respect to the underlayer and shapes in which the hairlike bodies have a portion that curls, as shown in FIG. 3, were observed. It was observed that a better tactile sensation was expressed by having such a shape.

The present invention was explained above using various embodiments, but it need not be mentioned that the technical scope of the present invention is not limited to the scope described in the above embodiments. It is clear to a person skilled in the art that it is possible to add various modifications or improvements to the above embodiments. Further, it is clear from the recitations of the claims that aspects in which such modifications or improvements are added are included in the technical scope of the present invention.

REFERENCE SIGNS LIST

1 Hairlike bodies and underlayer
1a Underlayer
1b Hairlike bodies
d Diameter of the hairlike bodies
h Height of the hairlike bodies
t Spacing of the hairlike bodies
2 Sealant resin layer
3 Substrate layer

The invention claimed is:

1. A manufacturing method for a resin sheet having hairlike bodies arranged regularly on at least one surface of an underlayer, the hairlike bodies being formed by:
melt extruding, from a die with an extrusion molding method, a thermoplastic resin having, on a log-log graph having elongational viscosity η(t) (unit: Pa·S) as measured at a strain rate of 0.5 (unit: S$^{-1}$) and at a temperature at which elongation is possible as the vertical axis and elongation time t (unit: S) as the horizontal axis, a region in which the slope (log η/log t) in the interval 0.1<t<1.0 is no greater than 0.5 and by the temperature range in which the adhesive force in probe tack measurement is 0.05-0.25 N/mm$^2$ at least partially overlapping with the temperature at which elongation is possible; and
adjusting a temperature of a transfer roll to the temperature of the thermoplastic resin at which elongation is possible and the temperature at which the adhesive force of the thermoplastic resin in probe tack measurement is 0.05-0.25 N/mm$^2$ and casting with a pinch pressure between the transfer roll and a touch roll of 30-120 Kg/cm$^2$,
wherein the hairlike bodies extend hairlike in a direction away from the underlayer in a shape in which the hairlike bodies thin approaching a tip, the average height of the hairlike bodies is no less than 100 μm and no greater than 1,200 μm, the average diameter of the hairlike bodies is no less than 1 82 m and no greater than 50 μm, and the average spacing of the hairlike bodies is no less than 20 μm and no greater than 200 μm,
the elongation viscosity is measured by using an elongation viscosity measuring instrument, retaining a 2 mm diameter cylindrical test piece on a roll with a width of 100 mm in an oil bath maintained at the temperature of the thermoplastic resin at which elongation is possible and stretching the test piece by rotating the roll at a fixed speed of 0.5 $S^{-1}$, the adhesive force is measured using a tackiness tester and, under the following conditions, placing a sample material on a stage, contacting a bottom surface of a columnar probe with a sample adhesive surface from above at a designated speed and with a designated load control and penetration control method, removing the probe from the sample at a set speed, and the resistance experienced by the probe due to the adhesive force at this time is measured as the load value:

Temperature: temperature at which elongation is possible of each thermoplastic resin,
Contact rate: 120 mm/minute,
Release rate: 600 mm/minute,
Contact load: 500 gf (0.25 N/mm$^2$),
Contact time: 15 seconds,
Probe shape: Columnar, ø 5 mm,
Probe material: Chromium oxide, and
the temperature at which elongation is possible is temperatures positioned between those of the rigid state and the molten state when a strand is set in a uniaxial elongation viscometer and stretched.

2. The manufacturing method according to claim 1, wherein at least part of the transfer roll surface is ceramic sprayed and a relief process has been performed on the ceramic-sprayed surface.

\* \* \* \* \*